(12) United States Patent
Niimi

(10) Patent No.: US 7,187,128 B2
(45) Date of Patent: Mar. 6, 2007

(54) JOINED BODIES, LUMINOUS CONTAINERS AND ASSEMBLIES FOR HIGH PRESSURE DISCHARGE LAMPS

(75) Inventor: Norikazu Niimi, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 83 days.

(21) Appl. No.: 10/852,724

(22) Filed: May 24, 2004

(65) Prior Publication Data
US 2004/0239227 A1    Dec. 2, 2004

(30) Foreign Application Priority Data
May 28, 2003   (JP)   ............ P2003-150512

(51) Int. Cl.
*H01J 17/18* (2006.01)
*H01J 61/36* (2006.01)

(52) U.S. Cl. ............ 313/623; 313/624; 313/625; 313/635

(58) Field of Classification Search ........... 313/318.08, 313/624, 625
See application file for complete search history.

(56) References Cited

U.S. PATENT DOCUMENTS

| | | | |
|---|---|---|---|
| 3,588,573 A | 6/1971 | Chen et al. ............ 313/325 |
| 4,076,991 A | 2/1978 | Datta | |
| 4,316,936 A * | 2/1982 | Hing .................... 428/325 |
| 4,507,584 A * | 3/1985 | Coaton et al. ......... 313/624 |
| 4,585,972 A * | 4/1986 | Hing .................... 313/636 |
| 6,126,889 A | 10/2000 | Scott et al. ............ 264/632 |
| 6,873,108 B2 * | 3/2005 | Hecker et al. ......... 313/624 |
| 2002/0033671 A1 * | 3/2002 | Niimi ................... 313/623 |

FOREIGN PATENT DOCUMENTS

| | | |
|---|---|---|
| EP | 1 296 355 | 3/2003 |
| JP | 56-44025 A1 | 4/1981 |
| JP | 56-44025 B2 | 10/1981 |
| JP | 2001-076677 A1 | 3/2001 |
| JP | 2001-519969 A1 | 10/2001 |
| WO | 03/030212 | 4/2003 |

* cited by examiner

*Primary Examiner*—Mariceli Santiago
*Assistant Examiner*—Elizabeth Rielley
(74) *Attorney, Agent, or Firm*—Burr & Brown

(57) ABSTRACT

A joined body is provided, including a first member having a first joining face and sapphire exposed at the first joining face and a second member having a second joining face and sapphire or polycrystalline alumina exposed at the second joining face. The first member and second member are joined by providing a raw material for the joining material between the first and second members and heat treating the raw material at a temperature of 1730° C. or lower.

6 Claims, 3 Drawing Sheets

JOINED BODIES, LUMINOUS CONTAINERS AND ASSEMBLIES FOR HIGH PRESSURE DISCHARGE LAMPS

This application claims the benefit of Japanese Patent Application P-2003-150512, filed on May 28, 2003, the entirety of which is incorporated by reference.

BACKGROUND OF THE INVENTION

1. Field of the Invention

The present invention relates to a joined body, a luminous vessel and an assembly for a high pressure discharge lamp.

2. Description of the Related Art

A high pressure discharge lamp with a discharge vessel of quartz has been widely used as a head light for an automobile due to its high brightness and light emission efficiency. The discharge vessel has a luminous portion and contains a light emitting gas inside of the vessel. The discharge vessel of such discharge lamp is made of quartz and thus transparent, so that the luminous portion may function as a point light source.

The assignee has filed a Japanese patent publication 2001-76677A, and disclosed a method of inserting pipes of molybdenum into openings at both ends, respectively, of a discharge vessel made of translucent alumina and of joining the pipes and the discharge vessel.

The discharge lamp described in Japanese patent publication 2001-76677A has been utilized as a pseudo point light source, for example, for an automobile. It has been, however, demanded a discharge lamp utilizing a transparent discharge vessel in fields including a head lamp for an automobile and a lamp for a projector.

Japanese patent publication 2001-519969A disclosed a method of sealing a luminous lamp made of sapphire and an end cap made of a polycrystalline alumina as a monolithic body.

Further, Japanese patent publication 56-44025B disclosed a composition of $Dy_2O_3$—$Al_2O_3$—$SiO_2$ system for sealing a ceramic discharge vessel for a discharge system.

Further, U.S. Pat. No. 3,588,573 disclosed a method of sealing high temperature vapor using an eutectic cement of $Dy_2O_3$—$Al_2O_3$ system.

According to the method described in Japanese patent publication 2001-519969A, the luminous vessel made of sapphire is joined with the end cap made of polycrystalline alumina by solid phase reaction. The inventors, however, have studied the joined body and encountered the following problems. That is, according to the method, grains of polycrystalline alumina may be easily grown along an interface between sapphire and polycrystalline alumina. When the growth of the grains of polycrystalline alumina is terminated before the grains are grown to a single crystal (sapphire), the resulting alumina grains are left along the joining interface. The mechanical strength at the joining interface is thus reduced, so that the joined body may be broken at the joining interface by a thermal stress, which does not otherwise result in the fracture of the joined body. The control of growth of the polycrystalline alumina grains is difficult along the interface of sapphire and polycrystalline alumina, because the growth of the grains is susceptible to sintering conditions or the like.

SUMMARY OF THE INVENTION

An object of the present invention is to provide a joined body of a first member comprising a first joining face and sapphire exposed at the first joining face and a second member comprising a second joining face and sapphire or polycrystalline alumina exposed at the second joining face, so that the joining strength can be improved and crack formation along the joining interface can be prevented.

According to a first aspect of the present invention, a joined body is provided, comprising a first member comprising a first joining face and sapphire exposed at the first joining face, a second member comprising a second joining face and sapphire or polycrystalline alumina exposed at the second joining face, and a joining material joining the first and second members. The first and second members are joined with each other by providing a raw material for the joining material between the first and second members and heat treating the raw material at a temperature of 1730° C. or lower The first aspect of the present invention further provides a luminous container comprising the joined body wherein the first member is a discharge vessel having an end portion with an opening formed therein and wherein the second member is a sealing member fixed at the end portion of the vessel. A first aspect of the present invention further provides an assembly for a high pressure discharge lamp, comprising the luminous vessel, an electrode provided in an inner space of the discharge vessel, and a conductor provided in the sealing member.

For example, when a ceramic discharge vessel for a high pressure discharge lamp and an end cap of a ceramics is joined with each other using a glass adhesive, the adhesive is susceptible to corrosion with a corrosive luminous gas filled in the discharge vessel. It is thus preferred that the discharge vessel and end cap are joined with each other at a higher temperature. Further, when they are joined using a joining material, it has been considered until now that a difference between the thermal expansion coefficient of a material for a discharge vessel and that for the end cap contributes to crack formation and a reduction of mechanical strength at the joining portion.

The inventors, however, found that the contribution of the joining temperature is far more considerable than that of the difference of the thermal expansion coefficients of sapphire and the material for the end cap when the discharge vessel is made of sapphire. That is, even when the difference of the thermal expansion coefficients of sapphire and end cap material is small or almost negligible, it is proved that cracks may be observed along the joining portion in a joined body joined at a high temperature. The reasons would be considered as follows:

(1) Sapphire has a relatively large rigidity (sapphire does not have flexibility of absorbing a stress generated due to deformation); and (2) The thermal stress is substantially in proportion with the difference of the thermal expansion coefficients and a temperature difference (=joining temperature "melting point of a joining material" minus room temperature).

It is considered that cracks may be induced due to the reasons (1) and (2), even when the difference of the thermal expansion coefficients is small. Further, even when the difference of the thermal expansion coefficients of sapphire and end cap is large to some degree, it is proved that crack formation in the joining portion can be prevented by lowering the joining temperature.

Specifically, when one object to be joined is sapphire and the other is sapphire or polycrystalline alumina, crack formation in the joining portion can be reduced and the joining strength can be increased by lowering the joining temperature to 1730° C. or lower. From this viewpoint, the joining temperature is preferably 1700° C. or lower.

Although the lower limit of the joining temperature is not particularly limited, the temperature is preferably 1550° C. or higher under normal circumstances, and more preferably, 1600° C. or higher. It is thus possible to prevent crack formation induced inside of the joining agent.

According to a second aspect of the present invention, a joined body is provided, comprising a first member comprising a first joining face and sapphire exposed at the first joining face, a second member comprising a second joining face and sapphire or polycrystalline alumina exposed at the second joining face, and a joining material joining the first and second members. The joining material comprises an oxide or an oxynitride containing a rare earth element, aluminum and silicon, and the oxide or oxynitride has a silicon content of 3 mole percent or higher and 10 mole percent or lower calculated as silicon dioxide.

The second aspect of the present invention further provides a luminous container comprising the joined body wherein the first member is a discharge vessel having an end portion with an opening formed therein and the second member is a sealing member fixed at the end of the vessel. The second aspect of the present invention still further provides an assembly for a high pressure discharge lamp, comprising the luminous container, an electrode provided in an inner space of the discharge vessel, and a conductor provided in the sealing member.

It is found that crack formation can be prevented by applying a joining material having the above described composition system in which the ratio of silicon is made 3 mole percent or higher and 10 mole percent or smaller calculated as silicon oxide.

According to a third aspect of the present invention, a luminous container is provided, comprising a discharge vessel comprising sapphire and an end portion with an opening formed therein, and a sealing member fixed at the end portion of the vessel. The vessel has sapphire or polycrystalline alumina exposed at the joining face. The c-axis of sapphire constituting the discharge vessel and the central axis of the vessel are intersected at an angle of 10° or lower. A third aspect of the present invention further provides an assembly comprising the luminous container, an electrode provided in an inner space of the discharge vessel and a conductor provided in the sealing member.

According to the aspect, c-axis of the vessel of sapphire is aligned in the substantially same direction as the central axis of the discharge vessel. It is found that the incidence of cracks can thus be considerably reduced along the interface of the discharge vessel and the second member fixed at the end portion of the vessel.

From this viewpoint, the c-axis of sapphire constituting the discharge vessel and the central axis of the vessel preferably intersect at an angle of 5° or lower.

The effects, features and advantages of the invention will be appreciated upon reading the following description of the invention when taken in conjunction with the attached drawings, with the understanding that some modifications, variations and changes of the same could be made by the skilled person in the art.

DETAILED DESCRIPTION OF THE INVENTION

Figure 1:
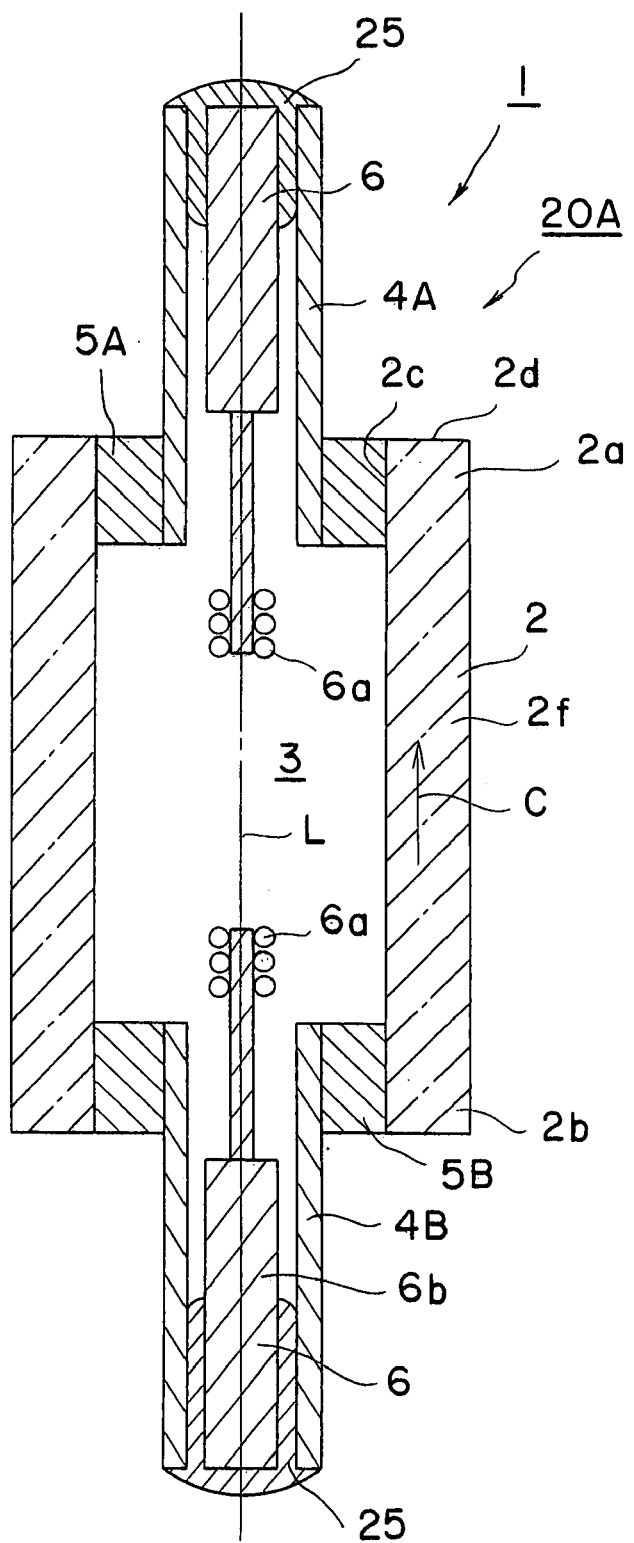
FIG. 1 is a longitudinal sectional view schematically showing an assembly 1 for a high pressure discharge lamp and a luminous container 20A according to one embodiment of the present invention.

FIG. 1 is a longitudinal sectional view schematically showing an assembly 1 for a high pressure discharge lamp and a luminous container 20A according to one embodiment of the present invention. A luminous vessel 2 has a pair of end portions 2a and 2b with openings formed therein and a luminous portion 2f between the end portions. Each of inner openings 2c in the end portions 2a, 2b is joined with a cylindrical sealing member 4A or 4B through a joining material 5A or 5B. An ionizable luminous substance and a starter gas are filled in an inner space 3 of the luminous vessel 2. In the case of a metal halide high pressure discharge lamp, an inert gas such as argon or xenon and a metal halide are filled in the inner space of the discharge vessel, and optionally mercury or a zinc metal is filled therein. 2d represents an end face of the luminous vessel 2, and 25 represents a sealing member.

An electrode member 6 has a supporting portion 6b and a coil shaped electrode 6a provided at the tip end of the supporting portion 6b. Although a coil 6a is provided at the tip end of the electrode member 6 in the present example, the coil 6a may be omitted.

According to the present example, raw materials for the joining materials 5A and 5B are provided between the discharge vessel 2 as the first member and the sealing members 4A and 4B as the second members, respectively. The materials are heat treated at a temperature of 1730° C. or lower to join the first and second members. Further, each of the joining materials 4A and 4B is composed of an oxide or an oxynitride containing a rare earth element, aluminum and silicon, and a ratio of silicon in the oxide or oxynitride is 3 mole percent or higher and 10 mole percent or lower calculated as silicon dioxide. Further, c-axis (as an arrow "C") of sapphire constituting the discharge vessel 2 and the central axis "L" of the discharge vessel are intersected by an angle of 10° or lower.

Figure 2:
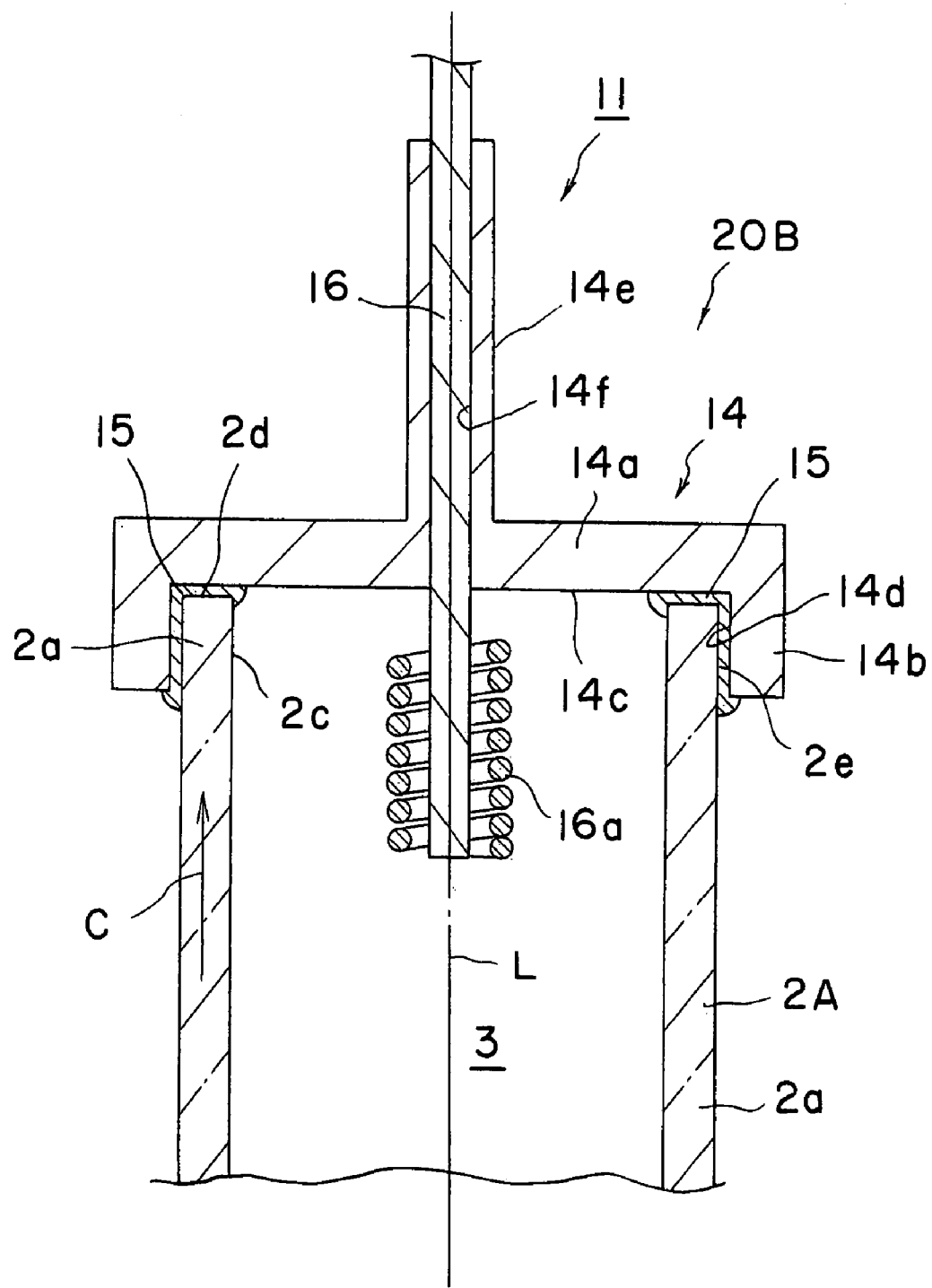
FIG. 2 is a longitudinal sectional view schematically showing an assembly 11 for a high pressure discharge lamp and a luminous container 20B according to another embodiment of the present invention.
Figure 3:
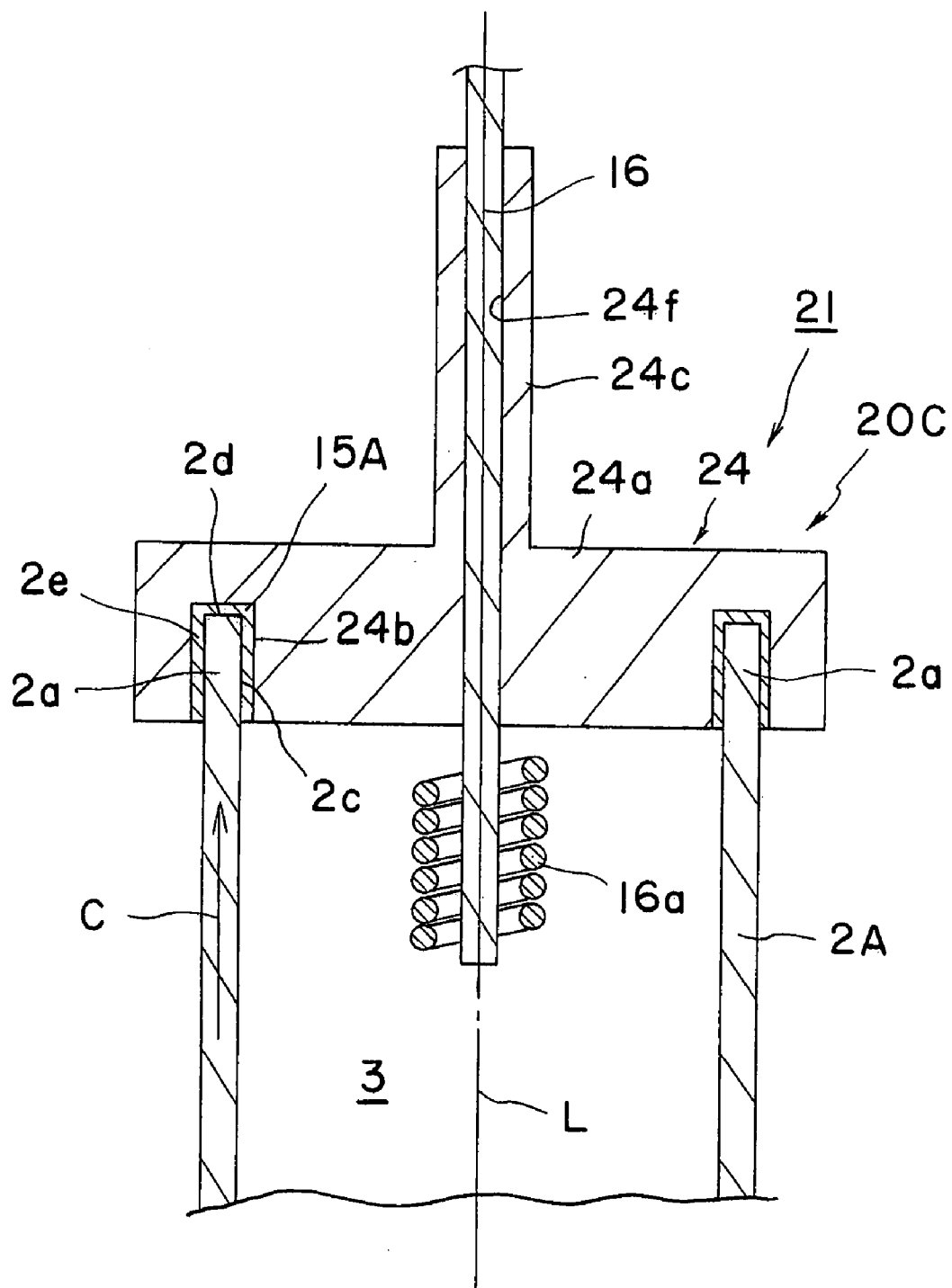
FIG. 3 is a longitudinal sectional view schematically showing an assembly 21 for a high pressure discharge lamp and a luminous container 20C according to still another embodiment of the present invention.

The shape of the discharge vessel or sealing member is not particularly limited, and may be that as shown in FIG. 2 or 3. In a discharge vessel 11 and luminous container 20B shown in FIG. 2, a discharge vessel 2A and sealing members 14 in end portions are joined with each other. The sealing member 14 at the end portion of the present example has a flat plate-shaped part 14a, a ring shaped flange part 14b protruding from the edge of the flat plate-shaped part 14a, and an electrode supporting part 14e protruding from the center of the flat plate-shaped part 14a. The electrode member 16 is inserted into a through hole 14f inside of an electrode supporting part 14e. An electrode 16a is provided at the tip end of the supporting part 14e.

The joining face 14c of the flat plate-shaped part 14a of the sealing member 14 is joined with the end face 2d of the discharge vessel 2A with a joining material 15. Further, the flange part 14b of the sealing member 14 is joined with the outer surface 2e of the discharge vessel 2A with a joining material 15.

In a discharge vessel 21 and luminous container 20C shown in FIG. 3, a discharge vessel 2A and sealing members 24 in end portions are joined with each other. The sealing member 24 at the end portion of the present example has a flat plate-shaped part 24a having a ring shaped groove 24b formed on one side and an electrode supporting portion 24c protruded on the opposite side. An electrode member 16 is inserted into a through hole 24f inside of the electrode supporting part 24c, and an electrode 16a is provided at the tip end of the supporting part 24c.

An end 2a of the discharge vessel 2A is inserted into the groove 24b. The inner wall surface facing the groove 24b of the sealing member 24 is joined with the end face 2d of the discharge vessel 2A, inner wall surface 2c and outer surface 2e with a joining material 15A.

According to the examples shown in FIGS. 2 and 3, raw materials for the joining material 15A and 15B are provided between the discharge vessel 2A as the first member and the sealing members 14 and 24 as the second members, respectively. The materials are then heat treated at a temperature of 1730° C. or lower to join the first and second members. Further, each of the joining materials 15A and 15B is composed of an oxide or an oxynitride containing a rare earth element, aluminum and silicon, and a ratio of silicon in the oxide or oxynitride is 3 mole percent or higher and 10 mole percent or lower calculated as silicon dioxide. Further, c-axis (as an arrow "C") of sapphire constituting the discharge vessel 2A and the central axis "L" of the discharge vessel 2A are intersected by an angle of 10° or lower.

In each of the above examples, an ionizable luminous substance and a starter gas are filled in an inner space 3 of the luminous vessel. In the case of a metal halide high pressure discharge lamp, an inert gas such as argon or xenon and a metal halide are filled in the inner space of the discharge vessel, and optionally mercury or a zinc metal are filled therein.

The material for a discharge electrode is not limited. The material is preferably a pure metal selected from the group consisting of tungsten, molybdenum, niobium, rhenium and tantalum, or the alloy of two or more metals selected from the group consisting of tungsten, molybdenum, niobium, rhenium and tantalum. Further, the material is preferably a composite material of the pure metal or the alloy and a ceramics.

In a preferred embodiment, the joining material has a crystallinity of 70 percent or higher for improving the air-tightness of the joining portion.

In a second aspect of the present invention, the joining material is composed of an oxide or an oxynitride containing a rare earth element, aluminum and silicon. The joining material may be an oxide substantially consisting of a rare earth element, aluminum and silicon. The material may further contain nitrogen atoms.

Specifically, the raw material for the joining material may contain a rare earth oxide, alumina and a silicon compound, and may optionally contain a nitride.

The rare earth oxide is the oxide or oxides of one or more element selected from the group consisting of samarium, scandium, yttrium, lanthanum, cerium, praseodymium, neodymium, promethium, europium, gadolinium, terbium, dysprosium, holmium, erbium, thulium, ytterbium and rhutenium. Particularly preferably, the rare earth oxide is one or more oxide(s) selected from the group consisting of $Sc_2O_3$, $Y_2O_3$, $La_2O_3$, $Gd_2O_3$, $Dy_2O_3$, $Ho_2O_3$ and $Tm_2O_3$.

The silicon compound includes silicon oxide, silicon nitride and sialon (SiAlON). The nitride includes silicon nitride, sialon, aluminum nitride and boron nitride.

In a preferred embodiment, the joining material is a mixture having the following raw composition.

Composition (A)

A rare earth oxide: 15 mole percent or higher and 70 mole percent or lower (more preferably 20 mole percent or higher, or, 60 mole percent or lower); Silicon oxide: 3 mole percent or higher and 10 mole percent or lower (more preferably 4 mole percent or higher, or, 8 mole percent or lower); and Alumina: 10 mole percent or higher and 65 mole percent or lower (more preferably 15 mole percent or higher, or, 60 mole percent or lower).

Composition (B)

A rare earth oxide: 10 mole percent or higher and 35 mole percent or lower (more preferably 15 mole percent or higher, or, 30 mole percent or lower); Silicon oxide: 3 mole percent or higher and 10 mole percent or lower (more preferably 4 mole percent or higher, or, 9 mole percent or lower); and Alumina: 7 mole percent or higher and 40 mole percent or lower Aluminum nitride (including silicon nitride): 8 mole percent or higher and 65 mole percent or lower.

The raw material composition is particularly preferably one of the following compositions: $Dy_2O_3$—$SiO_2$—$Al_2O_3$; $Sc_2O_3$—$SiO_2$—$Al_2O_3$; $Y_2O_3$—$SiO_2$—$Al_2O_3$; $Dy_2O_3$—$SiO_2$—$Al_2O_3$—$Si_3N_4$; $Sc_2O_3$—$SiO_2$—$Al_2O_3$—$Si_3N_4$; $Y_2O_3$—$SiO_2$—$Al_2O_3$—$Si_3N_4$; $Y_2O_3$—$SiO_2$—$Al_2O_3$—$Si_3N_4$; $Dy_2O_3$—$SiO_2$—$Al_2O_3$—AlN; $Sc_2O_3$—$SiO_2$—$Al_2O_3$—AlN; $Y_2O_3$—$SiO_2$—$Al_2O_3$—AlN; $Y_2O_3$—$Al_2O_3$—AlN—$Si_3N_4$; and $Dy_2O_3$—$Al_2O_3$—AlN—$Si_3N_4$.

The high pressure discharge lamp of the first, second and third aspects of the present invention may be applied for various lightening devices including a head lamp for an automobile, OHP (over head projector) and a liquid crystal projector.

Further, the inventive joined body may be widely applied to, other than a high pressure discharge lamp, all the structural bodies, such as a switching device of vacuum, having a conductive portion or terminal whose air-tightness at a high temperature of about 900° C. or higher is indispensable. The joined body may also be applied to applications that the body is to be exposed to a corrosive gas, particularly a halogen-based corrosive gas.

EXAMPLES

Experiment A

The assembly for a high pressure discharge lamp and luminous container shown in FIG. 1 were produced. Specifically, the discharge vessel 2 and sealing members 4A and 4B were formed of sapphire. The electrode member 6 was made of molybdenum.

A mixture of powdery raw materials of dysprosium oxide, alumina and silicon oxide was weighed. The ratios are shown in Table 1 (represented by an unit of molar percent).

TABLE 1

| Experiment Number | $Dy_2O_3$ | $Sc_2O_3$ | $Al_2O_3$ | $SiO_2$ |
|---|---|---|---|---|
| 1 | 48 | 0 | 52 | 0 |
| 2 | 40 | 8 | 52 | 0 |
| 3 | 65 | 0 | 32 | 3 |
| 4 | 65 | 0 | 18 | 17 |
| 5 | 77 | 0 | 13 | 10 |

Each mixture was shaped to obtain a ring-shaped body, which was then dewaxed at 700° C. in atmosphere. The thus obtained ring-shaped bodies were set at positions for the joining materials 5A and 5B shown in FIG. 1, and heat treated in non-oxidizing and dry atmosphere and then cooled. The temperature for the heat treatment was shown in table 2. The thus obtained luminous container of each example was stood still for 96 hours. The presence of cracks in sapphire was observed. The incidence of cracks is shown in Table 2.

TABLE 2

| Experiment Number | Thermal expansion Coefficient of Joining material | Joining Temperature (° C.) | Incidence of cracks After joining Process (%: within 96 hours) |
|---|---|---|---|
| 1 | About 8.3 (≈alumina) | 1830 | 100 |
| 2 | About 8.1 (≈alumina) | 1780 | 70 |
| 3 | About 8.1 (≈alumina) | 1650 | 0 |
| 4 | About 6.8 | 1650 | 25 |
| 5 | About 7.2 | 1650 | 10 |

As can be seen from the results, the incidence of cracks in sapphire after the joining process was considerably reduced by lowering the joining temperature to 1730° C. or lower. Cracks were observed when the difference of the thermal expansion coefficients of the joining material and sapphire was present. It was, however, proved that the contribution to the crack formation of the joining temperature is far more considerable than that of the difference of thermal expansion coefficients.

Further, the incidence of cracks in sapphire after the joining process was considerably reduced by lowering the content of silicon dioxide in the joining material to 10 mole percent or lower.

Experiment B

The assembly for a high pressure discharge lamp and luminous container shown in FIG. 1 were produced. Specifically, the discharge vessel 2 and sealing members 4A and 4B were formed of sapphire. The electrode member 6 was made of molybdenum. The joining material was made from a mixture of powdery raw materials of dysprosium oxide, alumina and silicon oxide. The ratio was: dysprosium oxide; 65 mole percent, alumina; 32 mole percent, and silicon oxide; 3 mole percent.

The mixture was shaped to obtain a ring-shaped body, which was then dewaxed at 700° C. in atmosphere. The thus obtained ring-shaped bodies were set at positions for the joining materials 5A and 5B shown in FIG. 1, and heat treated in non-oxidizing and dry atmosphere at 1650° C. and then cooled. The angle of c-axis of sapphire and central axis "L" of the vessel was changed as shown in table 3. The thus obtained luminous container of each example was stood still for 96 hours. The presence of cracks in sapphire was observed in sapphire. The incidence of cracks is shown in Table 3.

TABLE 3

|  | <5° | 10° | 20° |
|---|---|---|---|
| Incidence of cracks in sapphire (%) | 0 | 0 | 10 |

As can be seen from the results, the incidence of cracks in sapphire can be prevented by lowering an angle of the c-axis of sapphire and the central axis "L" of the vessel to 10° or lower.

As can be seen from the results, the present invention provides a joined body of a first member having a first joining face and sapphire exposed at the first joining face and a second member having a second joining face and sapphire or polycrystalline alumina exposed at the second joining face, so that the joining strength can be improved and crack formation along the joining interface can be prevented.

The present invention has been explained referring to the preferred embodiments, however, the present invention is not limited to the illustrated embodiments which are given by way of examples only, and may be carried out in various modes without departing from the scope of the invention.

The invention claimed is:

1. A joined body comprising:
a first member comprising a first joining face and having sapphire exposed at said first joining face;
a second member comprising a second joining face and having one of sapphire and polycrystalline alumina exposed at said second joining face; and
a joining material joining said first and second members;
wherein said joining material comprises an oxynitride containing a rare earth element, aluminum and silicon, and wherein said oxynitride has a silicon content in a range of at least 3 mole percent to 10 mole percent calculated as silicon dioxide.

2. A luminous container comprising the joined body of claim 1, wherein said first member is a sapphire discharge vessel having an end portion with an opening formed therein, and wherein said second member is a sealing member fixed at said end portion of said discharge vessel.

3. The luminous container of claim 2, wherein a c-axis of the sapphire constituting said discharge vessel and a central axis of said discharge vessel intersect at an angle of 10° or lower.

4. An assembly for a high pressure discharge lamp comprising the luminous container of claim 2, an electrode provided in an inner space of said discharge vessel, and a conductor provided in said sealing member.

5. The joined body of claim 1, wherein said joining material is provided between said first and second members and heat treated at a temperature of 1730° C. or lower to join said first and second members to one another.

6. The joined body of claim 1, wherein said joining material has a crystallinity of 70 percent or higher.

* * * * *